United States Patent [19]

Christophersen et al.

[11] Patent Number: 4,647,109
[45] Date of Patent: Mar. 3, 1987

[54] UPHOLSTERED SEAT ASSEMBLY AND A ONE-PIECE SEAT AND BACK SHELL OF MOLDED PLASTIC THEREFOR

[75] Inventors: David J. Christophersen, Milwaukee; Steven P. Spiegelhoff, Mukwonago, both of Wis.

[73] Assignee: Milsco Manufacturing Company, Milwaukee, Wis.

[21] Appl. No.: 835,298

[22] Filed: Mar. 3, 1986

[51] Int. Cl.$^4$ ............................................. A47C 7/02
[52] U.S. Cl. .................................... 297/457; 297/458; 297/DIG. 2
[58] Field of Search ................ 297/457, DIG. 2, 459, 297/458, 452

[56] References Cited

U.S. PATENT DOCUMENTS

| | | | |
|---|---|---|---|
| 3,032,375 | 5/1962 | Lalandre | 297/DIG. 2 |
| 3,159,428 | 12/1964 | Schier | 297/DIG. 2 |
| 3,335,434 | 8/1967 | Gamon | 297/DIG. 2 |
| 3,341,251 | 9/1967 | Costin | 297/DIG. 2 |
| 3,527,498 | 9/1970 | Werner | 297/DIG. 2 |
| 3,687,092 | 8/1972 | Manning | 297/DIG. 2 |
| 3,702,204 | 11/1972 | Tipton et al. | 297/DIG. 2 |
| 3,734,561 | 5/1973 | Barecki et al. | 297/DIG. 2 |
| 4,502,731 | 3/1985 | Snider | 297/DIG. 2 |

Primary Examiner—Francis K. Zugel
Attorney, Agent, or Firm—James E. Nilles

[57] ABSTRACT

An upholstered seat assembly and also a cushion and a one-piece seat and back shell for the assembly and molded of thin-walled plastic. The shell has a seat and an upwardly extending back, a continuous edge flange formed around said seat and back and formed integrally therewith. The cushion is secured to said flange, and the back and seat have side walls for the reception and support of the cushion. The seat has a plurality of generally parallel curvilinear slots which demarcate a plurality of generally parallel curvilinear spring segments extending transversely across the seat. The seat is sloped to have a positive bow for the segments to permit them to deflect downwardly in response to a load created by the occupant of the upholstered seat. The seat also has an underside and a generally rectangular and downwardly extending frame formed on the seat underside and which provides a mounting surface for the upholstered seat.

3 Claims, 8 Drawing Figures

UPHOLSTERED SEAT ASSEMBLY AND A ONE-PIECE SEAT AND BACK SHELL OF MOLDED PLASTIC THEREFOR

BACKGROUND OF THE INVENTION

This invention relates generally to an upholstered seat assembly which are often used in a variety of vehicles such as off-the-road tractors or mowers, and are usually suspended by means of springs or other resilient supports.

Examples of such prior art seats are shown in the U.S. Pat. No. 4,561,621 of Dec. 31, 1985, Kevin E. Hill; U.S. Pat. No. 4,307,913 of Dec. 29, 1981, Steven P. Spiegelhoff; U.S. Pat. No. 4,533,110 of Aug. 6, 1985, Kevin E. Hill; and U.S. Pat. No. 3,740,014 of June 19, 1973, Swenson et al., all of which show a one-piece seat and back and are assigned to an assignee common with the present invention.

Still other examples of prior art seats having resilient seat constructions are U.S. Pat. Nos. 3,171,691; 3,399,883; and West German No. 2,117,153; UK patent application No. 2,039,732 and European patent application No. 0,032,839, having a one-piece shell of resilient material.

SUMMARY OF THE INVENTION

The present invention provides an upholstered seat assembly and also a one-piece seat and back shell molded of thin-walled plastic for the upholstered seat assembly. The shell has a seat and an upwardly extending back formed as an intergral unit of such plastic. The shell includes a continuous edge flange formed around the seat and the back and to which a cushion can be attached, the back and seat having small side walls defining recessed portions for the reception and support of the cushion. The seat of the shell is sloped to provide a positive bow and a plurality of generally parallel curvilinear slots in the seat define a plurality of generally parallel curvilinear spring segments extending transversely across the seat. In this manner, the segments deflect downwardly in response to a load created by the occupant of the upholstered seat assembly. The shell provided by the present invention also has a frame formed on the underside of the seat and which provides a rigid and strong support for the seat and also provides a mounting surface for the shell so that it can be mounted on the vehicle or on an intervening resiliently mounted frame of the vehicle.

These and other advantages of the present invention will occur as this disclosure progresses.

DRAWINGS

Figure 1:
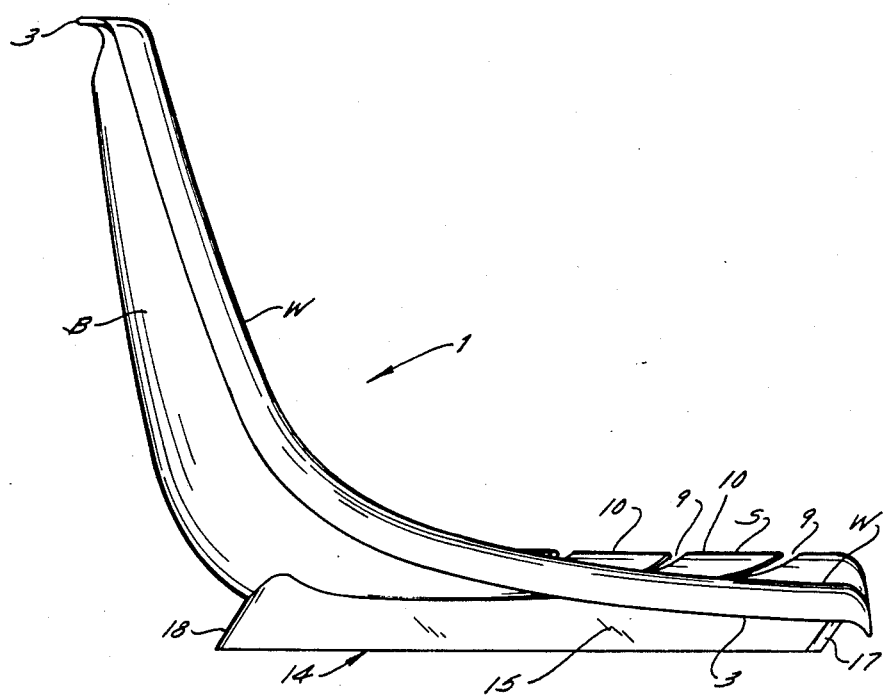
FIG. 1 is a side elevational view of the shell provided by the present invention.
Figure 2:
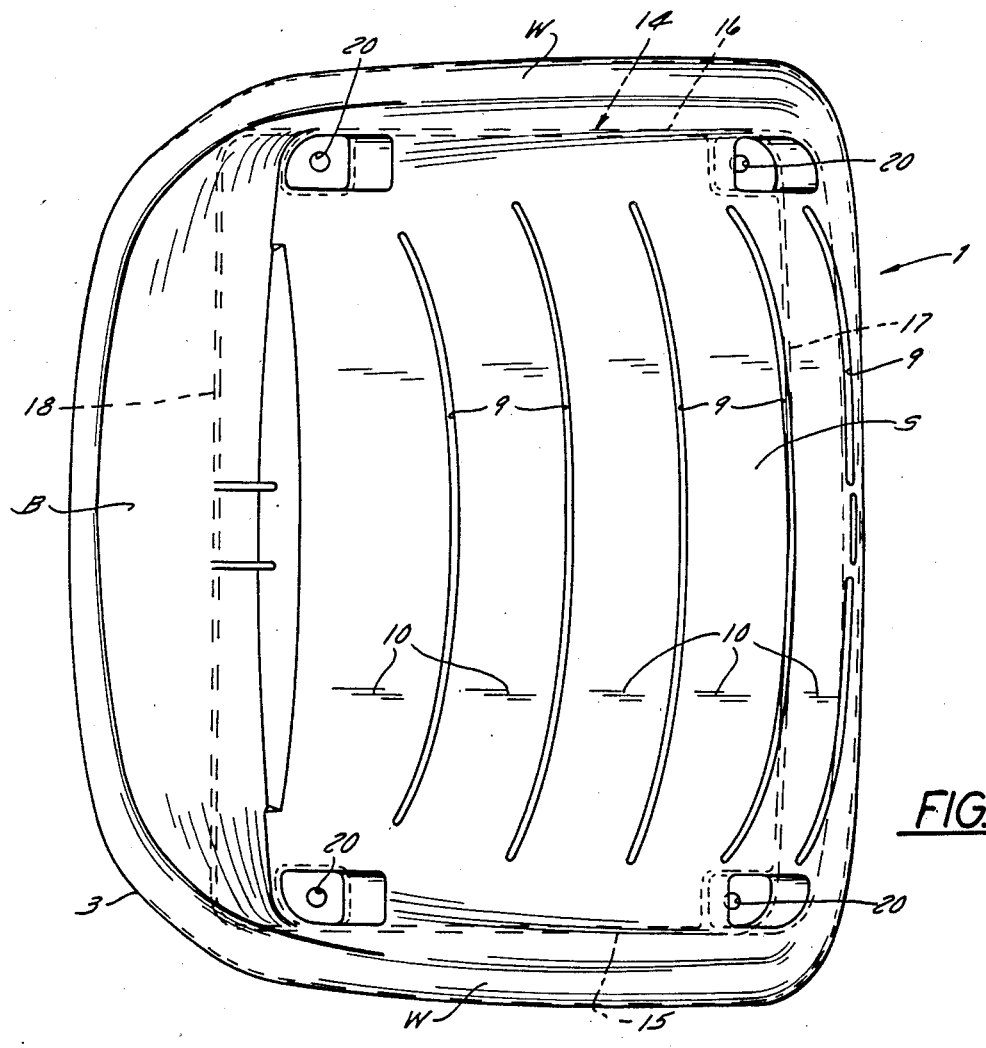
FIG. 2 is a plan view of the shell shown in FIG. 1.
Figure 3:
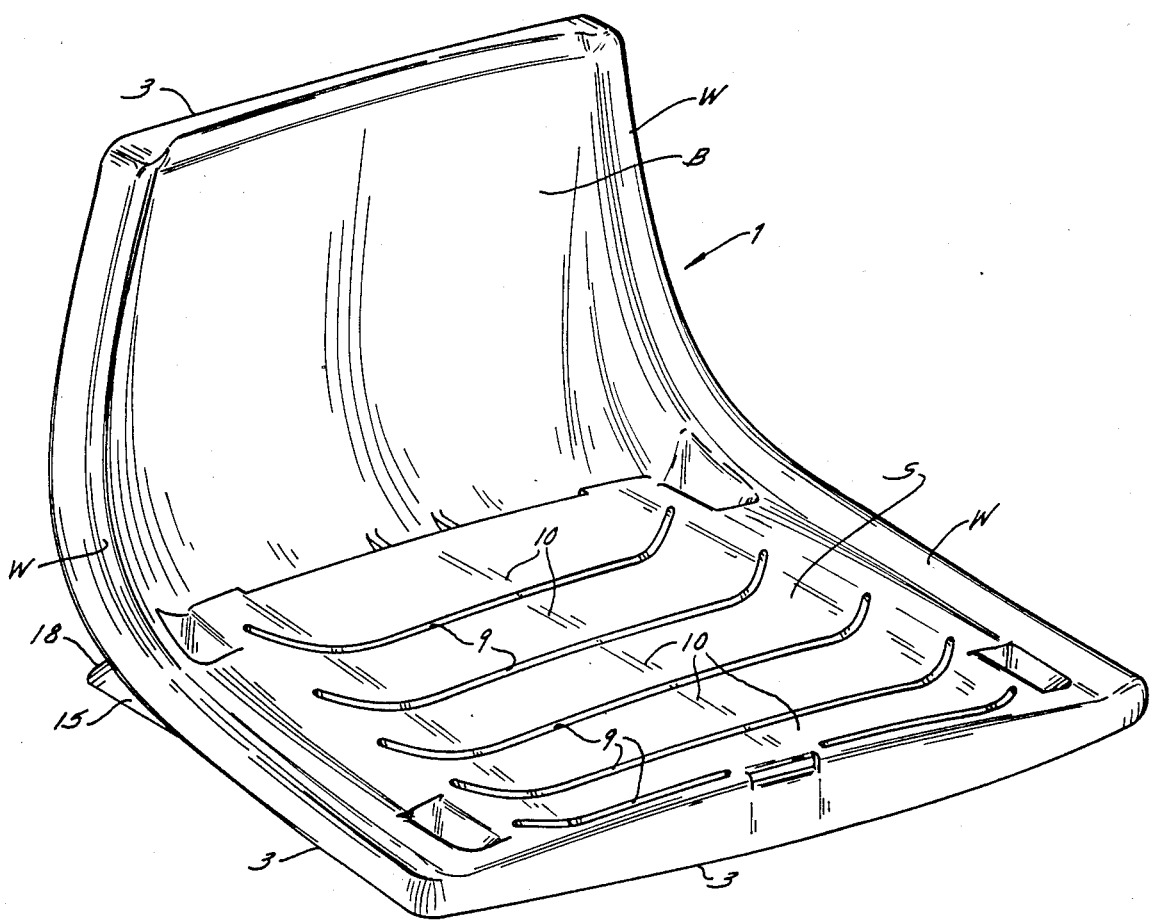
FIG. 3 is a perspective view of the shell shown in FIGS. 1 and 2, the view being taken generally from the front right side above the shell.
Figure 5:
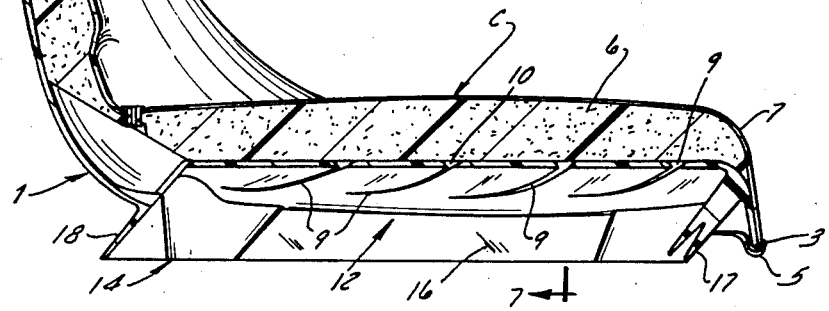
FIG. 5 is a side view of the completed upholstered seat assembly including the molded shell, the view being shown in section.
Figure 7:
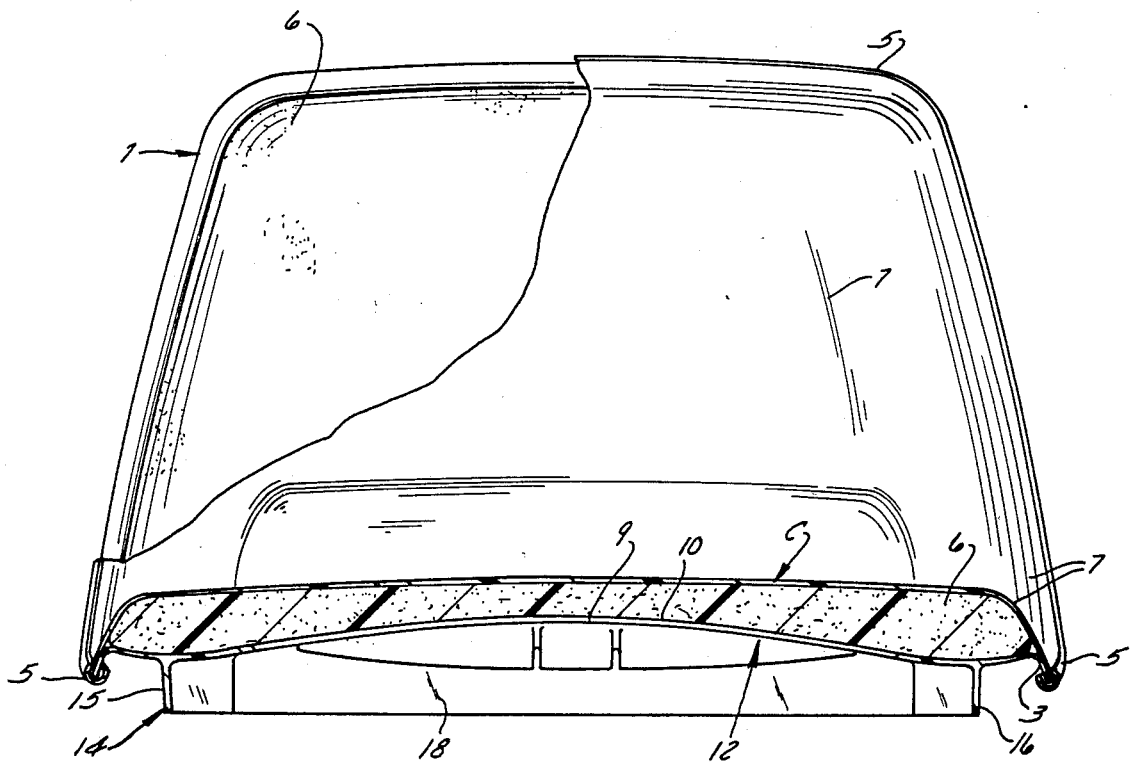
Figure 8:
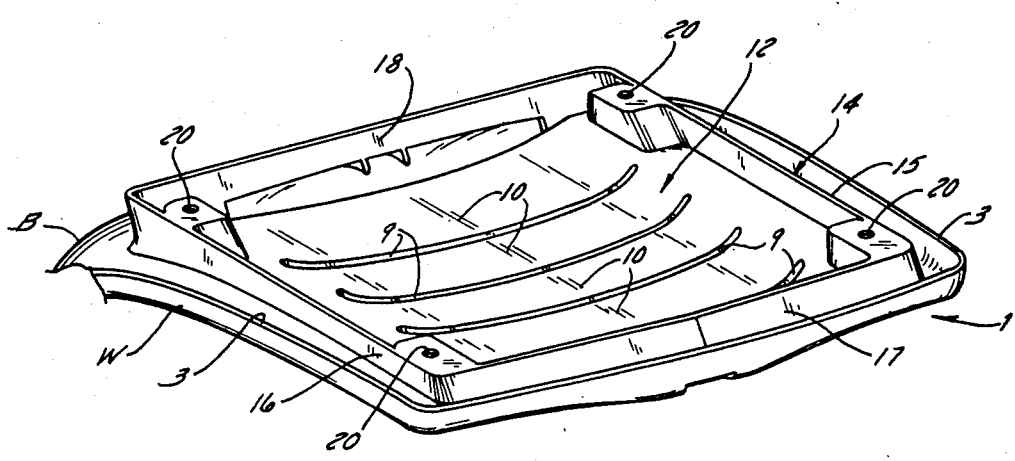

FIG. 7 is a transverse sectional view taken generally along the lines 7—7 in FIG. 5 and further having a portion of the upholstered back shown as broken away; and FIG. 8 is a bottom perspective view of the shell shown in FIGS. 1, 2 and 3, the back portion being shown as broken away, the view being reduced from the FIGS. 1, 2 and 3 views and showing the generally rectangular and downwardly extending frame formed on the seat underside.

DESCRIPTION OF A PREFERRED EMBODIMENT

The one-piece seat and back shell 1 as shown in FIGS. 1, 2 and 3 is molded from thin-walled plastic of a propylene copolymer having high impact resistance and strength, and with fillers such as talc or rubber fill. This material has a certain amount of resilience, particularly in the seat area and yet it is relatively strong and rigid.

Figure 4:
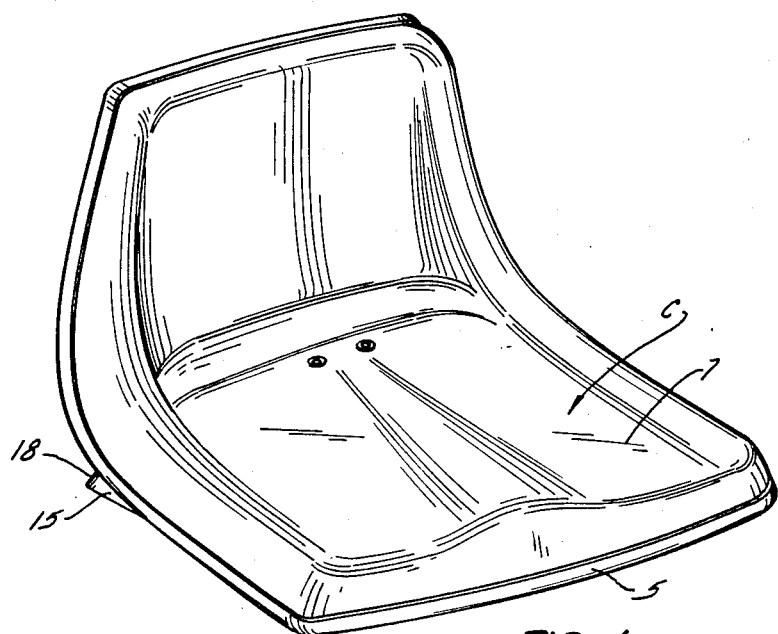
FIG. 4 is a perspective view of the shell after it has the cushion secured to it, the view being slightly reduced from the FIG. 3 showing.

The shell includes the seat S and the back B, both molded as an integral unit. The seat and the back have a side wall W that extends continuously along each of their sides and which, in effect, forms a recess in the seat and in the back for the support and reception of a cushion C (FIG. 4).

Figure 6:
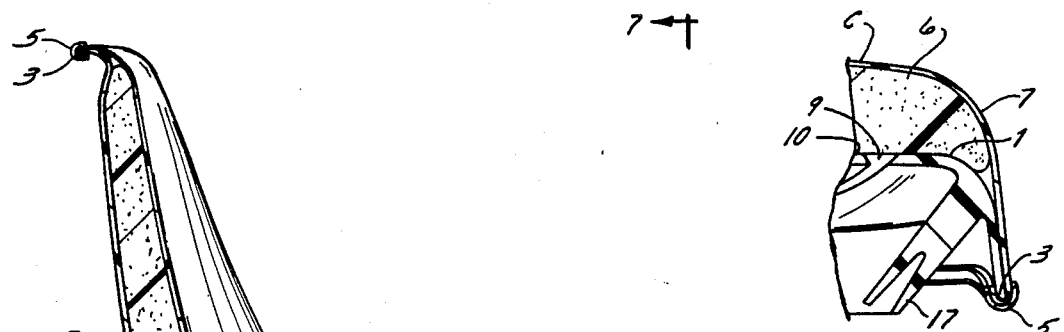
FIG. 6 is an enlarged fragmentary view of the front portion of the upholstered seat assembly shown in FIG. 5.

A continuous edge flange 3 is turned outwardly and formed around the seat and around the back and integrally therewith and the cushion C is attached to this edge flange as by stapling or by means of clips and/or a finishing strip 5 (FIGS. 5 and 6) secured over the edges of the flange and flexible covering of the cushion. This forms a mechanical bond between the seat and foam-in-place cushion.

A resilient means such as foam 6 may be previously formed and molded with the covering 7 of the cushion. This foam-in-place cushion is made by vacuum forming cover material into a filler mold cavity. The cavity is then partially filled with liquid foam. A lid is clamped down and the foam is given time to rise/set-up. After setting up, the cushion is removed from the mold and allowed to finish curing. The result is a filler with a cover that follows the contours of the filler and is bonded to the filler. The mold is shaped so that the contours on the bottom of the cushion match the contours of the seat pan. The bottom of the filler is not bonded to the seat pan in the foam-in-place process.

The seat S has a plurality of generally parallel curvilinear slots 9 which demarcate a plurality of generally parallel and curvilinear spring segments 10 that extend transversely across the seat. The seat is sloped generally upwardly toward its center and from its two sides and thus has a positive bow. As a result, the segments 10 are bowed and deflect downwardly when a load is created by the occupant of the upholstered seat assembly. Such a resilient segment construction is shown in the U.S. Pat. No. 4,502,731, issued Mar. 5, 1985, to Snider.

The seat also has an underside 12 (FIG. 8) and a generally rectangular and downwardly frame 14 is formed on this seat underside. The frame 14 includes two side walls 15 and 16 which are generally vertical in disposition and also includes a front wall 17 and rear wall 18 (FIGS. 1 and 8) which are inclined from the vertical. It will be noted from FIGS. 2, 3 and 8 that the front side of the seat is generally straight across in a transverse direction. With this construction the shell is easy to form from a molding standpoint.

The downwardly extending frame on the frame 14 on the seat underside provides a mounting surface for the shell and holes 20 which extend through the shell (FIGS. 2 and 8) can be used for the reception of bolts (not shown) which attach the shell to the vehicle or a resilient suspension system (not shown).

Recapitulation

The shell provided by the present invention provides an extremely strong and rigid combined seat and back which can be economically fabricated from the propylene copolymer plastic. The shell has the integrally formed reinforcing edge flange to which the cushion can be attached and which further rigidifies the structure of the shell. The shell includes the recessed portions for the reception and support of the cushion and prevent the latter from being shifted or misaligned.

The seat of the shell has resilient segments for providing operator comfort and also has the support and rigidifying frame beneath the seat for additional strength and which also serves as a mounting surface for the seat assembly.

I claim:

1. A one-piece seat and back shell molded of thin-walled propylene copolymer plastic of high impact resistance and toughness for an upholstered seat, said shell having a seat and an upwardly extending back, a continuous edge flange formed integrally with and around said seat and back and extending generally normally to said seat and back, said edge providing means for attachment of a cushion, said back and seat having inwardly curved side walls forming a recession therein for the reception and support of a cushion, said seat having a plurality of generally parallel curvilinear slots which demarcate a plurality of generally parallel curvilinear spring segments extending transversely across said seat, said seat being sloped to have a positive bow for said segments whereby said segments deflect downwardly in response to a load created by the occupant of the upholstered seat, said seat also having an underside, and a generally rectangular frame extending downwardly from said underside and formed integrally on said seat underside and located within and spaced inwardly from said edge flange around said seat, and means adjacent the corners of said frame providing a mounting surface for said shell.

2. The assembly set forth in claim 1 further characterized in that said cushion is formed as a filler of resilient foam material having a vacuum formed cover that follows the contour of the filler and the cushion so formed matches the contour of the seat.

3. The shell of claim 1 including a cushion secured to said continuous edge flange said cushion received and supported in said recession to form an upholstered seat assembly.

* * * * *